Patented Aug. 16, 1949

2,479,374

UNITED STATES PATENT OFFICE 2,479,374

PREPARATION OF ORGANO-SILICON COMPOUNDS

Robert H. Krieble, Schenectady, N. Y., assignor to General Electric Company, a corporation of New York No Drawing. Application April 8, 1947, Serial No. 740,263

8 Claims. (Cl. 260—448.2)

This invention relates to the preparation of organosilicon compounds and more particularly to the production of hydrocarbon-substituted halogenosilanes.

The present invention is based on my discovery that hydrocarbon-substituted halogenosilanes can be prepared by effecting reaction in the liquid phase at a temperature of from 0° to 150° C. in the presence of a catalyst for the reaction between (1) an unsaturated compound of corresponding to the general formula $$(Z)_m Si(R)_n (X)_{(4-m-n)}$$

where Z is a member of the class consisting of the vinyl and allyl radicals, R is a monovalent hydrocarbon radical containing no olefinic unsaturation, X is a halogen, $m$ is a whole number equal to from 1 to 4, and $n$ is one of the following: 0, 1, 2, and 3 (the sum of the number of substituents Z, R, and X always being equal to 4), and (2) a silicon compound containing at least one hydrogen and at least one halogen attached directly to the silicon atom, the remaining valences of the silicon atom being satisfied by substituents selected from the class consisting of hydrogen, monovalent hydrocarbon radicals, and halogens until all the valences of the silicon are satisfied.

For purposes of brevity, the unsaturated compound defined in (1) above will be referred to hereinafter as the "unsaturated silane" and the silicon compound defined in (2) above will be referred to as the "silicon hydride."

It was known prior to my invention that hydrocarbon halides could be caused to react with silicon to yield organohalogenosilanes. For example, in Rochow Patent 2,380,995, issued August 7, 1945, and assigned to the same assignee as the present invention, hydrocarbon halides are caused to react at elevated temperatures of the order of from about 200° to 500° C. with silicon, preferably in the presence of a metallic catalyst, to yield hydrocarbon-substituted halogenosilanes.

It was also known heretofore that hydrocarbon-substituted halogenosilanes could be prepared by effecting reaction in the vapor phase at highly elevated temperatures of the order of at least 450° C. between a hydrocarbon and a silicon halide, more particularly silicon tetrachloride. By means of this reaction, a hydrogen halide is split off to yield the hydrocarbon-substituted halogenosilane, the valence bond formerly bonding the removed hydrogen to the hydrocarbon now bonding the hydrocarbon to the silicon atom by means of a C—Si bond.

I have now discovered that I can prepare by direct synthesis hydrocarbon-substituted halogenosilanes easily and cheaply using much lower temperatures of reaction than has previously been possible by causing an unsaturated silane of the type identified above to react with a silicon hydride of the type also defined above. The products produced as the result of my reaction are characterized by having a hydrocarbon chain of from 2 to 3 carbon atoms wherein each terminal carbon atom of the chain is connected to a silicon atom by a C—Si linkage.

In the preferred embodiments of my claimed invention, there is present in the unsaturated silane at least one halogen and only one alkenyl group of the type disclosed above attached to the silicon atom, the remaining valences of the silicon atom being satisfied by monovalent hydrocarbons, or halogens, or both monovalent hydrocarbons and halogens. Thus R, as stated in the second paragraph of this application may be an alkyl radical, e. g., methyl, ethyl, propyl, butyl, isobutyl, etc.; aryl radical, e. g., phenyl, naphthyl, etc.; aralkyl radical, e. g., benzyl, phenylethyl, etc.; alkaryl radical, e. g., tolyl, ethyl-phenyl, etc., radicals; and X may be a halogen, e. g., chlorine, bromine, iodine, etc.

Among the unsaturated silanes which may be employed in the practice of my invention may be mentioned allyltrichlorosilane, allyltribromosilane, diallyldichlorosilane, diallyldibromosilane, triallylchlorosilane, vinyltrichlorosilane, vinyltrifluorosilane, divinyldichlorosilane, divinyldibromosilane, trivinylchlorosilane, allylmethyldichlorosilane, vinylmethyldichlorosilane, allylethyldibromosilane, vinyldibutylchlorosilane, vinylphenyldichlorosilane, allyldibenzylchlorosilane, allyltolyldibromosilane, tetraallylsilane, tetravinylsilane, vinyltrimethylsilane, triallylmethylsilane, diallyldiethylsilane, divinylmethylbromosilane, etc. I prefer to use allyltrichlorosilane or vinyltrichlorosilane.

In accordance with my invention I effect the reaction between the reactants at a temperature of from about 0° to 150° C. with at least a part of the reactants in the liquid phase and in the presence of a catalyst or promoter for the reaction. By means of these conditions of reaction, I am able to cause the hydrogen attached directly to the silicon hydride to add across the double bond of the above-described unsaturated silane without losing any atom of either the unsaturated silane or silicon hydride through the formation of essential by-products.

It was entirely unexpected and in no way could have been predicted that the aforementioned reaction would proceed in acordance with the above description since it was found that such compounds, for example, $SiCl_4$, $SiBr_4$, $CH_3SiBr_3$, and $(CH_3)_2SiBr_2$ did not add to unsaturated silanes under the aforementioned conditions of reaction. This also was contrary to the teachings of Kharasch et al. who showed, for example, that carbon tetrachloride, bromotrichloromethane, carbon tetrabromide, and bromoform would all react with olefins to give hydrocarbon-substituted halogenomethanes [see, for example, Kharasch, Urry and Reinmuth, Abstracts of the 109th Meeting of the American Chemical Society, page 6M; Kharasch, Jensen and Urry, Journal of the American Chemical Society, 68, 154 (1946)].

The general reaction embraced by my claimed invention is carried out in the presence of a catalyst for the reaction which is preferably soluble in one of the reactants. The catalyst may be described generally as one which is ordinarily employed as a peroxy polymerization catalyst for vinyl compounds and which is preferably capable of supplying free radicals, e. g., alkyl radicals, aryl radicals, etc. Among such catalysts may be mentioned, for example, aliphatic acyl peroxides, for instance, diacetyl peroxide, lauryl peroxide, stearyl peroxide, caprylyl peroxide, di-(methyl maleoyl) peroxide, etc.; peroxides of the aromatic series, for instance, dibenzoyl peroxide, 3,4-dichlorobenzoyl peroxide, etc.; mixed aliphatic and aromatic peroxides, for instance, acetyl benzoyl peroxide, etc.; organic hydroperoxides, for instance, secondary-butyl hydroperoxide, tertiary-butyl hydroperoxide, 1-hydroxycyclohexyl hydroperoxide-1, etc.; various organic per-compounds, for instance, di-(tertiary-butyl perphthalate), di-(tertiary-butyl persuccinate), di-(tertiary-butyl peradipate), tertiary-butyl perfuroate, tertiary-butyl perbenzoate, etc.; dihydrocarbon peroxides, for instance, diethyl peroxide, ethyl-butyl peroxide, di-(tertiary-butyl) peroxide, dibenzal diperoxide, etc.; other peroxides, such as ascaridole, cyclohexanone peroxide, urea hydrogen peroxide, diheptanol peroxide, etc. Diacetyl and dibenzoyl peroxides are the preferred catalysts.

Any suitable amount of catalyst may be used, but in general the catalyst concentration will be in the range of from about 0.01 to 1 or more mols catalyst per mol of the unsaturated silane, preferably 0.05 to 0.25 mol catalyst per mol of the unsaturated silane. In many instances, the amount of catalyst employed will vary depending on the amount of inhibitory impurities in the reactants, type of reactants, etc.

Although ultra-violet light causes the formation of the organo-silicon compounds, I prefer to use preformed catalysts of the type disclosed above. The use of Friedel-Crafts catalysts, for example, aluminum chloride, etc., should be avoided since they tend to cause the formation of excessive amounts of undesirable by-products with a subsequent reduction in yield of the desired product.

The reaction between the unsaturated silane and the silicon hydride may be carried out in several ways. One method comprises mixing the reactants and the catalyst together in a pressure reactor capable of being heated and preferably provided with a means of agitation. The pressure reactor or autoclave is then heated or cooled (as the case may be) under autogenous pressure at a temperature of from about 0° to 150° C., preferably from about 60° to 120° C. Where the unsaturated silane and silicon hydride have sufficiently high boiling points, I may conduct the reaction at atmospheric pressure in an open reaction chamber. It is desirable to conduct the reaction under such conditions that the reactants and catalysts are in the same phase.

Although the length of time of heating the reaction mass is not critical, the exact time required will depend upon such factors as, for example, type of reactants employed, kind of catalyst, the temperature conditions maintained, type of product desired, etc. Usually, I have found that most of the reactions generally go to completion when the reaction mass is heated at temperatures of from about 60° to 120° C. for from about 4 to 36 hours, the preferred conditions of time and temperature being dependent, for example, on the particular catalyst and concentration of catalyst employed.

At the conclusion of the reaction, the contents of the autoclave are removed and the components of the reaction mass separated as, for example, by fractional distillation. This method, i. e., fractional distillation, of separating the desired product from the reaction mass is particularly amenable to my type of reaction since the relatively low temperatures employed during the course of the reaction prevent the formation of undesirable by-products which might interfere with the separation of the desired product and recovery of the unreacted materials.

The proportions of unsaturated silane and the silicon hydride employed in my process may be varied within wide limits depending upon the type of product desired. Thus I may employ from about 1 or more mols, preferably from about 2 to 6 or more mols, of the silicon hydride per mol of the unsaturated silane.

In order that those skilled in the art may understand the manner in which the present invention may be practiced, the following specific examples are given by way of illustration rather than by way of limitation.

*Example 1*

A mixture comprising 70 grams (0.44 mol) vinyltrichlorosilane, 134 grams (1.0 mol) trichlorosilane and about 3.1 grams (0.026 mol) diacetyl peroxide was heated for 24 hours at 100° C. in a glass-lined autoclave. At the end of this time the reaction mass was removed and fractionally distilled to yield 24.6 grams of a colorless liquid boiling at about 199° C. This material was identified as 1,2-bis-trichlorosilylethane [bis-(trichlorosilyl) ethane] having the structural formula $Cl_3Si-CH_2-CH_2-SiCl_3$ as evidenced by the fact that on analysis it was found that the compound contained about 70.8 per cent hydrolyzable chlorine (calculated 71.6 per cent).

*Example 2*

In this example 135.5 grams (1.0 mol) trichlorosilane, 87.8 grams (0.5 mol) allyltrichlorosilane and about 1.54 grams (0.013 mol) diacetyl peroxide were heated together for 6½ hours in an autoclave at 100° C. At the end of this time, the reaction mass was removed from the pressure reactor and fractionally distilled to obtain 52 grams of 1,3-bis-trichlorosilylpropane having the structural formula Cl₃Si — CH₂ — CH₂ — CH₂ — SiCl₃. This compound had a boiling point of 111° C. at 20 mm. and about 222° C. at 760 mm. Analysis of the compound for hydrolyzable chlorine showed it to contain 68.3 per cent (calculated 68.5 per cent). Based on the unrecovered allyltrichlorosilane, this represented a yield of about 80 per cent of the theoretical.

*Example 3*

Using the procedure employed in the above two examples, the compound corresponding to the formula

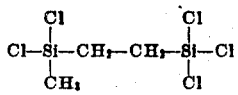

may be prepared by effecting reaction in the presence of a catalyst of the type disclosed previously between vinyltrichlorosilane and methyldichlorosilane.

In addition to the silicon hydrides employed above in the foregoing examples, other silicon hydrides containing a hydrogen and halogen attached directly to the silicon atom of the type described previously may also be employed, for example, inorganic silicon hydrides, for instance, SiHBr₃, SiHCl₂I, SiHFBr₂, SiHCl₂Br, SiH₂Cl₂, SiH₂Br₂, SiH₂BrCl, SiH₃Cl, Si₂H₄Cl₂, Si₂H₄Br₂, Si₂HBr₅, Si₂HCl₅, etc.; silicon hydrides containing a monovalent hydrocarbon radical connected directly to the silicon by a C—Si linkage, for example, CH₃SiHBr₂, CH₃SiHClI, (CH₃)₂SiHCl, CH₃SiHBrCl, C₃H₅SiHCl₂, the foregoing compounds being examples of a silicon hydride wherein the monovalent hydrocarbon radical is an alkyl radical; C₆H₅SiHCl₂, this compound being an example of a silicon hydride wherein the monovalent hydrocarbon radical is an aryl radical; C₇H₇SiHBr₂ (benzyldibromosilane), this compound being an example of a silicon hydride wherein the monovalent hydrocarbon radical is an aralkyl radical; methyl phenylchlorosilane (CH₃SiHC₆H₅Cl), etc. The methods for preparing the various silicon hydrides may be ascertained by reference to various books and articles on the subject. In the preferred embodiments of this invention, I employ silicon hydrides wherein at least two chlorine atoms and at least one hydrogen atom are attached directly to the silicon atom, e. g., HSiCl₃, methyldichlorosilane, phenyldichlorosilane, etc. It is also preferred that no olefinic unsaturation be present in the silicon hydride.

It will be apparent to those skilled in the art that diluents may be employed in effecting reaction between the unsaturated silane and the silicon hydride. However, I prefer to effect the reaction in the absence of such diluents in order to render the separation of the materials less difficult. The reaction should be carried out under anhydrous conditions in order to avoid hydrolysis of the organohalogenosilanes.

The materials obtained by the practice of my invention have many uses among them as intermediates in the preparation of silicone resins similar to those described, for example in Rochow Patents 2,258,218 and 2,258,220, issued October 7, 1941 and assigned to the same assignee as the present invention. They may also be employed for rendering water-repellent materials which are originally water-non-repellent in accordance with the process disclosed and claimed in Patnode Patent 2,306,222, issued December 2, 1942. Since the halogens attached to the silicons are readily reactable, high-boiling oils or plasticizers may be formed by hydrolyzing the materials per se or by react'ng the active halogen atoms with alcohols or Grignard reagents.

What I claim as new and desire to secure by Letters Patent of the United States is:

1. The process for preparing organo-silicon compounds which comprises effecting reaction in the liquid phase at a temperature of from 0° to 150° C. in the presence of a peroxy catalyst for the reaction between (1) a compound of the general formula (Z)$_m$Si(R)$_n$(X)$_{4-m-n}$ where Z is a member of the class consisting of the vinyl and allyl radicals, R is a monovalent hydrocarbon radical free of olefinic unsaturation, X is a halogen, $m$ is an integer equal to from 1 to 4, and $n$ is one of the following: 0, 1, 2, and 3, and (2) a silicon compound containing at least one hydrogen and one halogen attached directly to the silicon atom, the remaining valences of the silicon atom being satisfied by substituents selected from the class consisting of hydrogen, alkyl radicals, aryl radicals, aralkyl radicals, and halogens.

2. The process for preparing organo-silicon compounds which comprises effecting reaction in the liquid phase at a temperature of from 0° to 150° C. in the presence of an organic peroxide catalyst between (1) allyl trichlorosilane and (2) a silicon compound containing at least one hydrogen and one halogen atom attached directly to the silicon atom, the remaining valences of the silicon atom being satisfied by substituents selected from the class consisting of hydrogen, alkyl radicals, aryl radicals, aralkyl radicals, and halogens.

3. The process for preparing organo-silicon compounds which comprises effecting reaction in the liquid phase at a temperature of from 0° to 150° C. in the presence of an organic peroxide catalyst between (1) vinyltrichlorosilane and (2) a silicon compound containing at least one hydrogen and one halogen atom attached directly to the silicon atom, the remaining valences of the silicon atom being satisfied by substituents selected from the class consisting of hydrogen, alkyl radicals, aryl radicals, aralkyl radicals, and halogens.

4. The process for preparing organo-silicon compounds which comprises effecting reaction in the liquid phase at a temperature of from 0° to 150° C. in the presence of an organic peroxide catalyst between (1) a compound corresponding to the general formula (Z)$_m$Si(R)$_n$(X)$_{4-m-n}$ where Z is a member of the class consisting of the vinyl and allyl radicals, R is a monovalent hydrocarbon radical free of olefinic unsaturation, X is a halogen, $m$ is an integer equal to from 1 to 4, and $n$ is one of the following: 0, 1, 2, and 3, and (2) trichlorosilane.

5. The process for preparing bis-(trichlorosilyl) propane which comprises effecting reaction in the liquid phase at a temperature of from 0° to 150° C. in the presence of an organic peroxide catalyst between allyltrichlorosilane and trichlorosilane.

6. The process for preparing bis-(trichlorosilyl) ethane which comprises effecting reaction in the liquid phase at a temperature of from 0° to 150° C. in the presence of an organic peroxide catalyst between vinyltrichlorosilane and trichlorosilane.

7. The process for preparing bis-(trichlorosilyl) propane which comprises effecting reaction in the liquid phase at a temperature of from 60° to 120° C. in the presence of diacetyl peroxide between (1) allyltrichlorosilane and (2) trichlorosilane, the latter two ingredients being present in the molar ratio of at least 2 mols of the latter per mol of the former.

8. The process for preparing bis-(trichlorosilyl) ethane which comprises effecting reaction in the liquid phase at a temperature of from 60° to 120° C. in the presence of diacetyl peroxide between (1) vinyltrichlorosilane and (2) trichlorosilane, the latter two ingredients being present in the molar ratio of at least 2 mols of the latter per mol of the former.

ROBERT H. KRIEBLE.

REFERENCES CITED

The following references are of record in the file of this patent:

UNITED STATES PATENTS

| Number | Name | Date |
| --- | --- | --- |
| 2,379,821 | Miller | July 3, 1945 |
| 2,407,181 | Scott | Sept. 3, 1946 |

OTHER REFERENCES

Volnov, "Jour. Gen. Chem.," U. S. S. R., vol. 10 (1940), pages 1600–1604.

Ellis, "Chemistry of Synthetic Resins," vol. 1 (1935), page 241, Reinhold, N. Y., publishers.